United States Patent
Hook et al.

(10) Patent No.: US 10,216,289 B2
(45) Date of Patent: Feb. 26, 2019

(54) LASER POINTER EMULATION VIA A MOBILE DEVICE

(71) Applicant: INTERNATIONAL BUSINESS MACHINES CORPORATION, Armonk, NY (US)

(72) Inventors: James K. Hook, Eastleigh (GB); Hamish C. Hunt, Middlesex (GB); Nicholas K. Lincoln, Hampshire (GB); Simon D. Stone, Hampshire (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 166 days.

(21) Appl. No.: 15/141,962

(22) Filed: Apr. 29, 2016

(65) Prior Publication Data
US 2017/0315629 A1 Nov. 2, 2017

(51) Int. Cl.
*G06F 3/0346* (2013.01)
*G06F 3/14* (2006.01)
*G06F 3/038* (2013.01)

(52) U.S. Cl.
CPC .......... *G06F 3/0346* (2013.01); *G06F 3/0386* (2013.01); *G06F 3/1454* (2013.01)

(58) Field of Classification Search
USPC ....... 345/158, 156, 520, 633, 473, 427, 420; 345/157, 169; 382/294; 455/556.1; 370/352; 705/26.7
See application file for complete search history.

(56) References Cited

U.S. PATENT DOCUMENTS

| | | | |
|---|---|---|---|
| 8,502,836 B2 | 8/2013 | Theimer et al. | |
| 2002/0186217 A1* | 12/2002 | Kamata | G06T 15/10 345/427 |
| 2004/0224722 A1 | 11/2004 | Lee | |
| 2008/0246760 A1* | 10/2008 | Jeong | G06T 13/00 345/420 |
| 2009/0115724 A1* | 5/2009 | Yamamoto | G06F 3/0346 345/158 |
| 2009/0160768 A1 | 6/2009 | Kumar | |
| 2009/0298538 A1* | 12/2009 | Gao | G06F 3/0346 455/556.1 |
| 2009/0322679 A1* | 12/2009 | Sato | A63F 13/02 345/158 |

(Continued)

FOREIGN PATENT DOCUMENTS

KR 1020000063106 A 7/1999

OTHER PUBLICATIONS

IBM, IP.com No. IPCOM000175987D "Using a mobile phone for presentation support", Oct. 30, 2008; 2 pgs.
(Continued)

*Primary Examiner* — Thuy Pardo
(74) *Attorney, Agent, or Firm* — Cantor Colburn LLP

(57) ABSTRACT

Methods, systems and computer program products for emulating a laser pointer with a mobile device are provided. Aspects include determining a position of the mobile device in a room having a display screen, determining a location of the display screen in the room, and determining an orientation of the mobile device. Aspects also include calculating a line vector originating from the mobile device and modifying a display on the display screen to include an indicator of a point at which the line vector intersects the display screen based on a determination that the line vector intersects the display screen.

18 Claims, 3 Drawing Sheets

(56) References Cited

U.S. PATENT DOCUMENTS

| | | | |
|---|---|---|---|
| 2010/0303057 A1* | 12/2010 | Yosef | H04L 65/1069 370/352 |
| 2011/0164832 A1* | 7/2011 | Yoon | G06T 7/73 382/294 |
| 2011/0230238 A1 | 9/2011 | Aronsson et al. | |
| 2013/0162537 A1* | 6/2013 | Sato | A63F 13/02 345/158 |
| 2014/0022281 A1* | 1/2014 | Georgeson | G06F 3/1454 345/633 |
| 2014/0145944 A1* | 5/2014 | Chang | G06F 3/03542 345/157 |
| 2014/0244429 A1* | 8/2014 | Clayton | G06Q 30/0631 705/26.7 |
| 2014/0267031 A1* | 9/2014 | Huebner | G06F 3/0346 345/158 |
| 2015/0193982 A1* | 7/2015 | Mihelich | H04W 4/026 345/633 |
| 2015/0371440 A1* | 12/2015 | Pirchheim | G06T 17/05 345/419 |
| 2016/0035141 A1* | 2/2016 | Suto | G09G 5/00 345/633 |
| 2016/0163104 A1* | 6/2016 | Hou | G06T 17/00 345/520 |

OTHER PUBLICATIONS

Motorola et al., IP.com No. IPCOM000009231D, "Portable Electronic Prodis Incorporating Laser Light Pointer", Jun. 1, 1999; 3 pgs.

Myers, et al., Abstract of "Taking handheld devices to the next level", IEEE.org, vol. 37: Issue 12; Date of Publication: Dec. 2004; Current Version: Jan. 10, 2005; Issue Date: Dec. 2004; 2 pgs.

Seifert et al., "PointerPhone: Using Mobile Phones for Direct Pointing Interactions with Remote Displays", Interact 2013, Part III, LNCS 8119, pp. 18-35.

* cited by examiner

LASER POINTER EMULATION VIA A MOBILE DEVICE

BACKGROUND

The present invention generally relates to the emulating a laser pointer, and more particularly to the emulation of a laser pointer via a mobile device.

During meetings and classes, it is common for presenters to use laser pointers to point to a portion of a display to indicate the portion of the display that they are referring to for the audience. Traditional laser pointers are small handheld devices that project a colored laser light that can be easily used to point at a desired target portion of a display. However, due to the small nature, such laser pointers can often be misplaced, lost or stolen. In addition, the laser pointers include batteries that need to be charged or replaced often.

In addition, the diameter of the laser emitted by the laser pointer is fixed. Accordingly, laser pointers are often only useful in some limited settings. For example, the use of a traditional laser pointer by a professor in a large lecture hall with a very large display may not be practical as the size of the dot created on the display screen is too small to draw the attention of the audience.

SUMMARY

In accordance with an embodiment, a method for emulating a laser pointer via a mobile device is provided. The method includes determining a position of the mobile device in a room having a display screen, determining a location of the display screen in the room, and determining an orientation of the mobile device. The method also includes calculating a line vector originating from the mobile device and modifying a display on the display screen to include an indicator of a point at which the line vector intersects the display screen based on a determination that the line vector intersects the display screen.

In another embodiment of the invention, a processing system for emulating a laser pointer with a mobile device includes a processor configured to control a content displayed on a display screen. The processor is configured to determine a position of the mobile device in a room having the display screen, determine a location of the display screen in the room, and determine an orientation of the mobile device. The processor is also configured to calculate a line vector originating from the mobile device and modify the content displayed on the display screen to include an indicator of a point at which the line vector intersects the display screen based on a determination that the line vector intersects the display screen.

In accordance with a further embodiment, a computer program product for emulating a laser pointer via a mobile device includes a non-transitory storage medium readable by a processing circuit and storing instructions for execution by the processing circuit for performing a method. The method includes determining a position of the mobile device in a room having a display screen, determining a location of the display screen in the room, and determining an orientation of the mobile device. The method also includes calculating a line vector originating from the mobile device and modifying a display on the display screen to include an indicator of a point at which the line vector intersects the display screen based on a determination that the line vector intersects the display screen.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments include methods, systems, and computer program products for emulating a laser pointer with a mobile device. In exemplary embodiments, a mobile device is configured to communicate with a processing system that controls a content displayed on a display screen. The mobile device includes a plurality of sensors that are used to orient the mobile device relative to the display screen. Based on the relative orientation and position of the mobile device and the display screen a calculation is performed to determine if a vector originating from the mobile device intersects the display screen. If the vector originating from the mobile device intersects the display screen, the processing system modifies the content displayed on a display screen to include an indicator of where the vector originating from the mobile device intersects the display screen. In exemplary embodiments, the user of the mobile device can configure the shape, size and/or color of the indicator.

In exemplary embodiments, the processing system can modify multiple displays that are displaying the same content. In addition, the processing system may be configured to communicate with multiple mobile devices to facilitate more than on user using pointers. In exemplary embodiments, the processing system is configured to use a state estimation filter when determining if and where the vector originating from the mobile device intersects the display screen. The use of a state estimation filter, such as a Kalman filter, is to ensure smooth movement of the indicator on the display screen and to filter out any erroneous readings from the sensors in the mobile device. As will be appreciated by those of ordinary skill in the art, a wide variety of methods can be used to ensure smooth movement. Such methods include, but are not limited to a Kalman filter, an extended Kalman filter, a nonlinear Bayesian filter, dynamic data reconciliation (DDR) filter, double exponential smoothing, a particle filter, and a Gauss-Newton filter.

Figure 1:
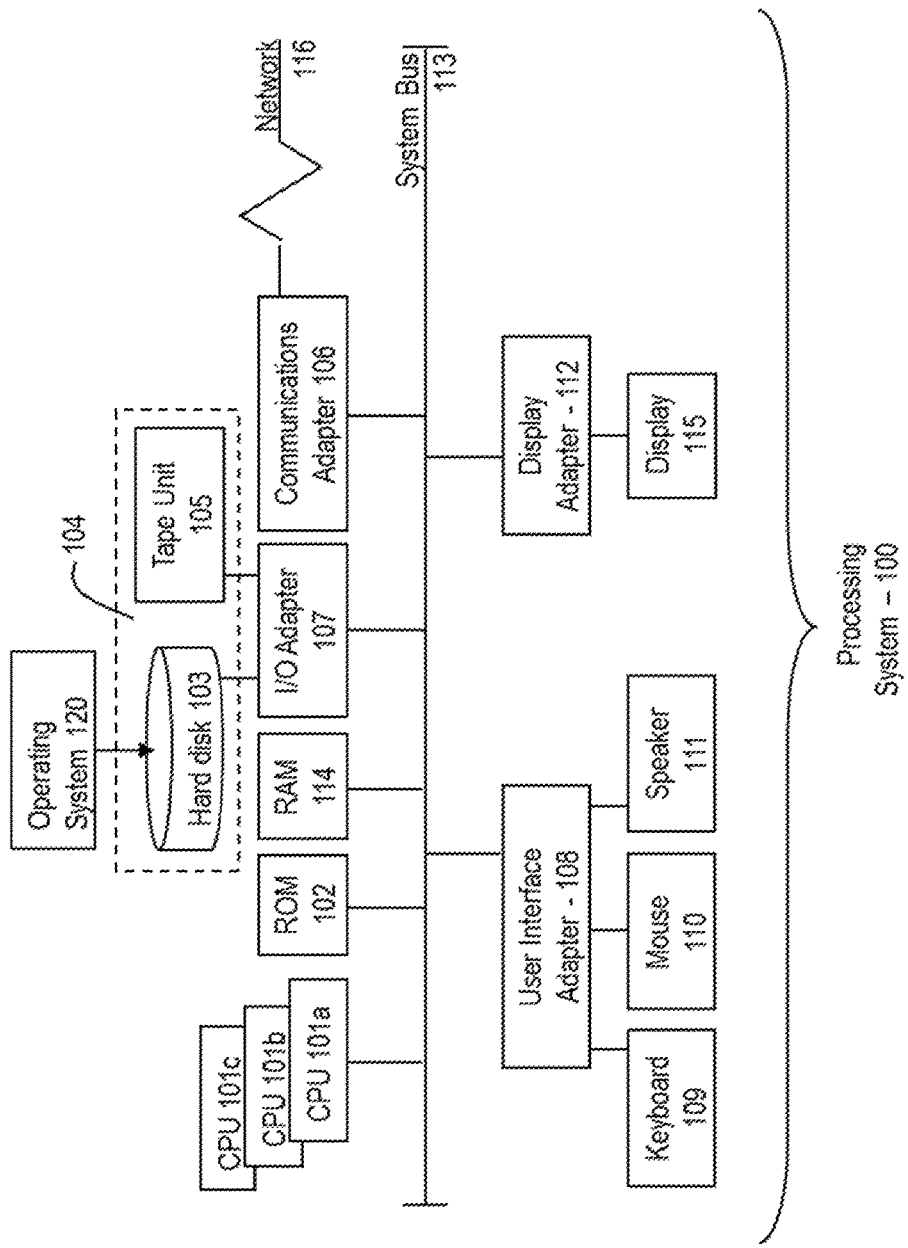
FIG. 1 is a block diagram illustrating one example of a processing system for practice of the teachings herein.

Referring to FIG. 1, there is shown an embodiment of a voicemail processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the voicemail processing system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
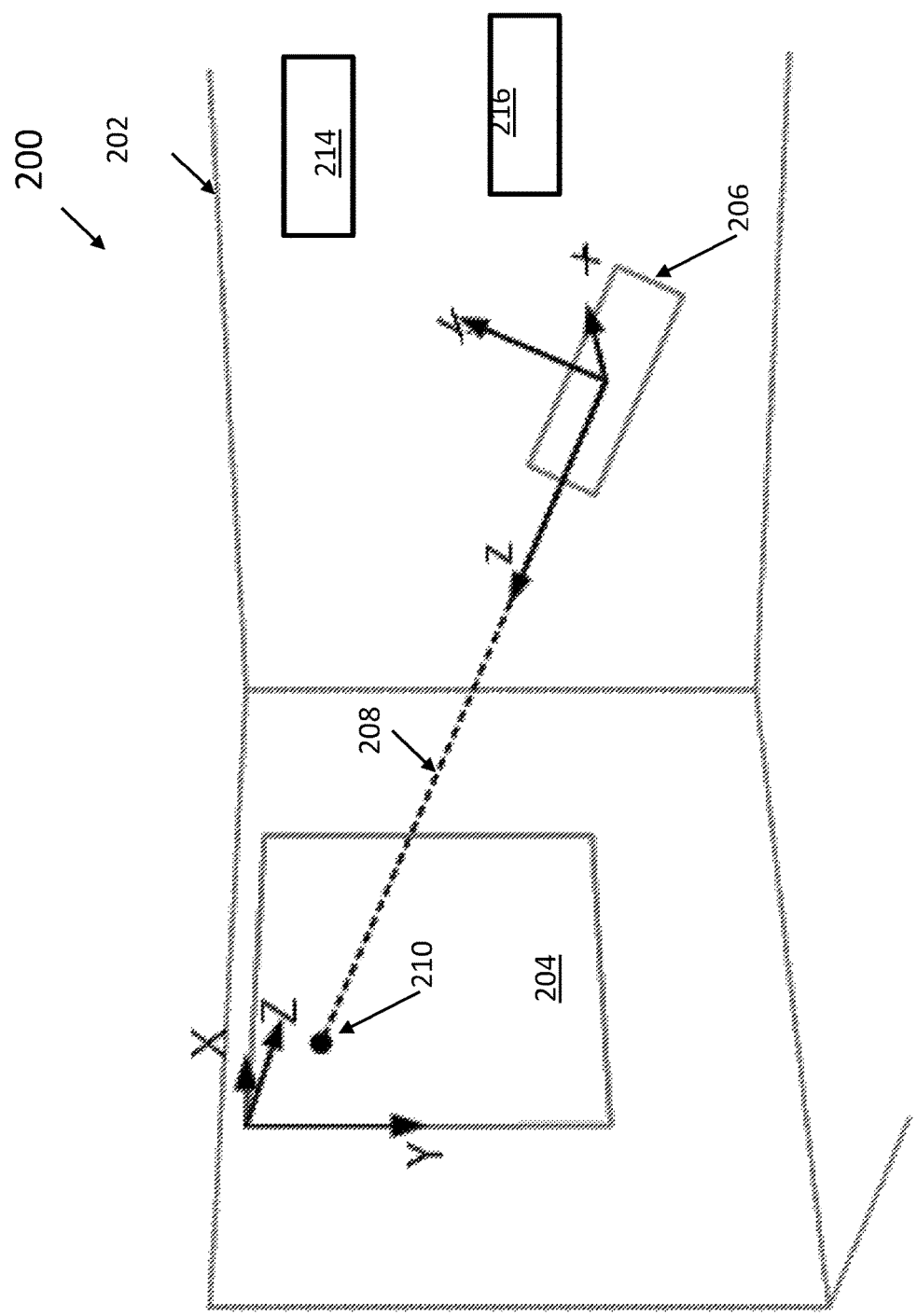
FIG. 2 is a block diagram illustrating a system for emulating a laser pointer via a mobile device in accordance with exemplary embodiments.

Referring now to FIG. 2, a system 200 for emulating a laser pointer via a mobile device in accordance with an embodiment is shown. As illustrated, the system 200 includes a room 202 that includes a display screen 204 and a mobile device 206. In exemplary embodiments, the display screen 204 may be a television, computer monitor, a projection screen, or the like. The content displayed on the display screen 204 is controlled by a processing system 214, which may be a processing system as shown in FIG. 1. In one embodiment, the processing system 214 is in communication with a projector 216, which projects content onto the display screen 204. In another embodiment, the processing system 214 is in communication with the display screen 204 to provide content to be displayed directly to the display screen 204.

In exemplary embodiments, the mobile device 206 is a smartphone that includes one or more sensors that include, but are not limited to, a camera, an accelerometer, a gyroscope, and the like. The mobile device 206 is configured to use the one or more sensors to determine its position and orientation in the room 202 and to determine a location of the display screen 204 in the room. In exemplary embodiments, information received from the sensors in the mobile device is used to perform a Self-Localization and Mapping (SLAM) process, which is also referred to as simultaneous localization and mapping. The SLAM process is used to track both the location of the display screen in three-dimensional space and the orientation of the mobile device.

In one embodiment, a vector 208 is calculated that passes through a central axis of the mobile device 206 extending from a bottom portion of the mobile device 206 and out of a top portion of the mobile device 206, i.e., such that the vector 208 is co-planer with a display screen of the mobile device 206. In another embodiment, a vector 208 is calculated through a minor axis of the mobile device 206 extending from a back portion of the mobile device 206 and out of a front portion of the mobile device 206, i.e., such that the vector 208 is perpendicular with the display screen of the mobile device 206. After the vector 208 has been calculated, a determination is made whether the vector 208 intersects the display screen 204. If the vector 208 intersects the display screen 204 then an indicator 210 can be computationally added to the content being displayed on the display screen 204 at the location of the determined intersection, as illustrated in FIG. 2.

In exemplary embodiments, information received from the inertial sensors, i.e., the accelerometer and gyroscope, is used in combination with images taken from available cameras (both front and rear facing if available) on the mobile device to perform the SLAM process. The inertial sensors can be used as a high-frequency measurement, with the images being used as a lower frequency, or correction, for the state estimation process, in addition to performing the mapping aspect of the SLAM process.

In exemplary embodiments, the process for emulating a laser pointer with a mobile device includes training the mobile device to determine its location, and the orientation and the location of the display screen. The training process includes ensuring that the display screen is visible by the mobile device camera and detecting and recording the corners of the display screen. The training process also includes scanning the surrounding area with the mobile device camera and executing the SLAM algorithm to map the area and locate the mobile device being trained within that area.

In exemplary embodiments, due to implementing a state estimation filter, the state estimation of the mobile device will progress smoothly and consequently so will the intersection calculations. As a result, the indicator on the display screen will not be subject to large amounts of jitter. As a presenter moves the mobile device, the SLAM algorithm continues, with the state estimation being updated in combination with expanding the known local map, and with subsequent intersection calculations being performed to update the location of the marker on the projection area.

In exemplary embodiments, the processing system can be used to modify multiple displays that are displaying the same content. In one example, if a user in a meeting that has multiple display screens displaying the same content in the same room points to one of the display screens, the indicator can be added to each of the display screens displaying the content of the screen being pointed to. In another example, a user in a meeting that has multiple display screens displaying the same content but in different locations, i.e., not in the same room, the indicator can be added to each of the display screens displaying the content of the screen being pointed to.

In exemplary embodiments, an application on a mobile device 206 is configured to communicate with the processing system 214 to facilitate the use of the mobile device 206 to modify the content displayed on the display screen 204. In exemplary embodiments, the mobile device 206 may communicate with the processing system 214 via WiFi, Bluetooth, or any other suitable communication means.

In exemplary embodiments, a user of a mobile device 206 launches the application and is presented with one or more usage options, such as laser pointer mode or cursor mode. If laser pointer mode is selected the user of the mobile device 206 is able to control the size, shape and color of the indicator 210 that will be displayed on the display screen 204. If the user selects cursor mode, the mobile device 206 is configured to act as a mouse and can be used to move the cursor around the display screen 204. In exemplary embodiments, the mobile device 206 may display a right click or left click buttons on a display of the mobile device 206 that can be used to perform advanced functions such as drag and drop, or selection of one or more items on the display. In one embodiment, in the cursor operating mode the display of the mobile device 206 may also include a keyboard icon that can be used to allow a user to enter and/or edit text on the display screen 204.

Figure 3:
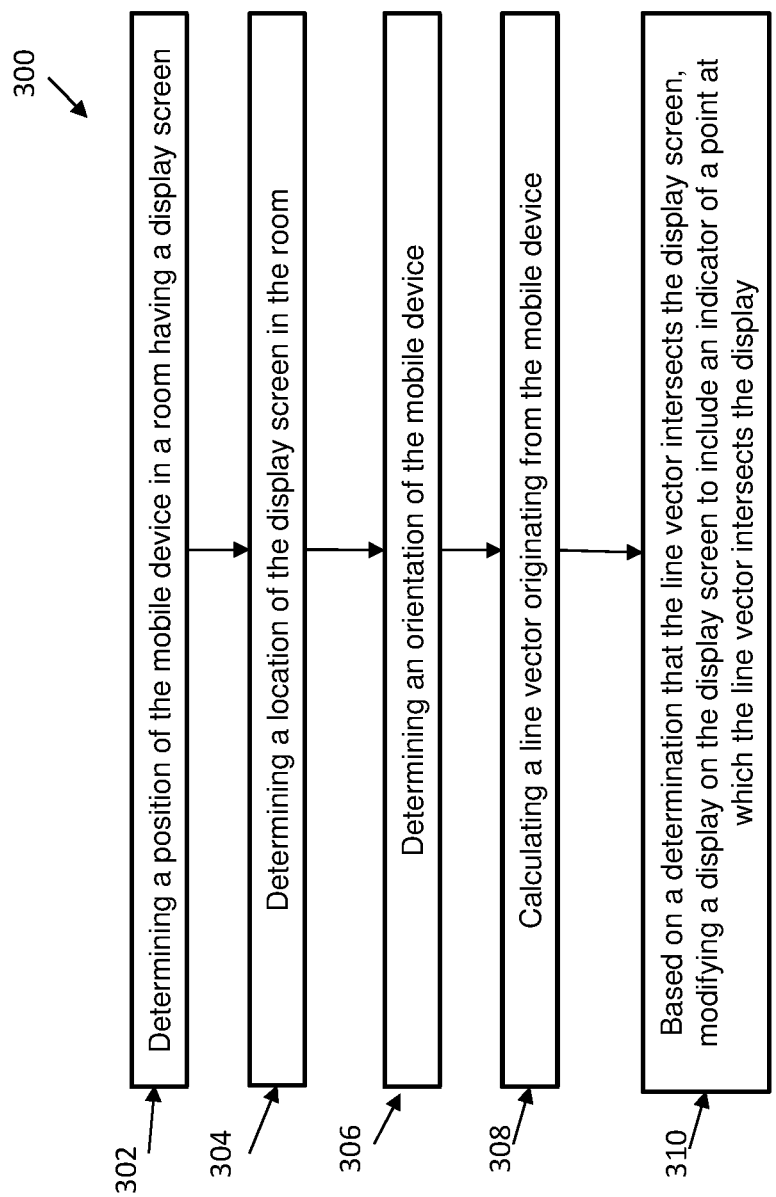
FIG. 3 shows a flow chart illustrating a method for emulating a laser pointer via a mobile device in accordance with an embodiment.

Referring now to FIG. 3, a method 300 for emulating a laser pointer via a mobile device is shown. As shown at block 302, the method 300 includes determining a position of the mobile device in a room having a display screen. Next, as shown at block 304, the method 300 includes determining a location of the display screen in the room. The method 300 also includes determining an orientation of the mobile device, as shown at block 304. In exemplary embodiments, the determination of the position of the mobile device in the room, the location of the display screen in the room, and the orientation of the mobile device are based on information received from one or more sensors in the mobile device. The one or more sensors include but are not limited to, a camera, an accelerometer, a gyroscope, and the like.

The method 300 also includes calculating a line vector originating from the mobile device, as shown at block 308. In exemplary embodiments, the line vector is a vector that extends through the mobile along the major axis of the mobile device and out of a top of the mobile device, such as the one shown in FIG. 2. Next, as shown at block 310, the method 300 includes modifying a display on the display screen to include an indicator of a point at which the line vector intersects the display screen based on a determination that the line vector intersects the display screen.

In exemplary embodiments, the method 300 may also include determining a second position of a second mobile device in the room, determining a second orientation of the second mobile device, and calculating a second line vector originating from the second mobile device. The method 300 may further include modifying the display on the display screen to include a second indicator of a point at which the second line vector intersects the display screen based on a determination that the second line vector intersects the display screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-method for emulating a laser pointer with a mobile device, the method comprising:
    determining a position of the mobile device in a room having a display screen;
    determining a location of the display screen in the room;
    determining an orientation of the mobile device;
    calculating a line vector originating from the mobile device; and
    based on a determination that the line vector intersects the display screen, modifying a display on the display screen to include an indicator of a point at which the line vector intersects the display screen, wherein the mobile device is a smartphone and wherein at least one of a size and a color of the indicator are configurable by a user of the mobile device, and
    wherein the mobile device includes a display screen that is configured to be used to select, drag and drop one or more items on the display screen.

2. The computer-method of claim 1, further comprising:
    detecting a change in at least one of the position and the orientation of the mobile device; and
    updating the calculation of line vector and the point at which the line vector intersects the display screen based on the change.

3. The computer-method of claim 2, wherein updating the calculation of line vector and the point at which the line vector intersects the display screen using a state estimation filter such as a Kalman filter.

4. The computer-method of claim 1, further comprising updating a display of a second display screen disposed in a location outside of the room to include the indicator of the point at which the line vector intersects the display screen.

5. The computer-method of claim 1, further comprising:
    determining a second position of a second mobile device in the room;
    determining a second orientation of the second mobile device;
    calculating a second line vector originating from the second mobile device; and
    based on a determination that the second line vector intersects the display screen, modifying the display on the display screen to include a second indicator of a point at which the second line vector intersects the display screen.

6. The computer-method of claim 5, wherein the indicator is distinguishable from the second indicator.

7. A computer program product for emulating a laser pointer with a mobile device, the computer program product comprising:
    a non-transitory storage medium readable by a processing circuit and storing instructions for execution by the processing circuit for performing a method comprising:
    determining a position of the mobile device in a room having a display screen;
    determining a location of the display screen in the room;
    determining an orientation of the mobile device;
    calculating a line vector originating from the mobile device; and
    based on a determination that the line vector intersects the display screen, modifying a display on the display screen to include an indicator of a point at which the line vector intersects the display screen, wherein the mobile device is a smartphone and wherein at least one of a size and a color of the indicator are configurable by a user of the mobile device, and
    wherein the mobile device includes a display screen that is configured to be used to select, drag and drop one or more items on the display screen.

8. The computer program product of claim 7, further comprising:
    detecting a change in at least one of the position and the orientation of the mobile device; and
    updating the calculation of line vector and the point at which the line vector intersects the display screen based on the change.

9. The computer program product of claim 8, wherein updating the calculation of line vector and the point at which the line vector intersects the display screen using a state estimation filter such as a Kalman filter.

10. The computer program product of claim 7, further comprising updating a display of a second display screen disposed in a location outside of the room to include the indicator of the point at which the line vector intersects the display screen.

11. The computer program product of claim 7, further comprising:
    determining a second position of a second mobile device in the room;
    determining a second orientation of the second mobile device;

calculating a second line vector originating from the second mobile device; and based on a determination that the second line vector intersects the display screen, modifying the display on the display screen to include a second indicator of a point at which the second line vector intersects the display screen.

12. The computer program product of claim 11, wherein the indicator is distinguishable from the second indicator.

13. A processing system for emulating a laser pointer with a mobile device includes a processor configured to control a content displayed on a display screen, the processor configured to:

determine a position of the mobile device in a room having the display screen;

determine a location of the display screen in the room;

determine an orientation of the mobile device;

calculate a line vector originating from the mobile device; and based on a determination that the line vector intersects the display screen, modify the content displayed on the display screen to include an indicator of a point at which the line vector intersects the display screen, wherein the mobile device is a smartphone and wherein at least one of a size and a color of the indicator are configurable by a user of the mobile device, and wherein the mobile device includes a display screen that is configured to be used to select, drag and drop one or more items on the display screen.

14. The processing system of claim 13, wherein the processor is further configured to:

detect a change in at least one of the position and the orientation of the mobile device; and update the calculation of line vector and the point at which the line vector intersects the display screen based on the change.

15. The processing system of claim 14, wherein updating the calculation of line vector and the point at which the line vector intersects the display screen using a state estimation filter such as a Kalman filter.

16. The processing system of claim 13, wherein the processor is further configured to update a display of a second display screen disposed in a location outside of the room to include the indicator of the point at which the line vector intersects the display screen.

17. The processing system of claim 13, wherein the line vector extends through a major axis of the mobile device and out of a top portion of the mobile device.

18. The processing system of claim 13, wherein the processor is further configured to:

determine a second position of a second mobile device in the room;

determine a second orientation of the second mobile device;

determine a second line vector originating from the second mobile device; and based on a determination that the second line vector intersects the display screen, modifying the content displayed on the display screen to include a second indicator of a point at which the second line vector intersects the display screen.

* * * * *